(12) United States Patent
Nakatani et al.

(10) Patent No.: US 12,140,602 B2
(45) Date of Patent: Nov. 12, 2024

(54) ANALYSIS-DEVICE SELECTION DEVICE AND ANALYSIS-DEVICE SELECTION METHOD

(71) Applicant: SHIMADZU CORPORATION, Kyoto (JP)

(72) Inventors: Takayuki Nakatani, Kyoto (JP); Yugo Hase, Kyoto (JP); Tomohiro Kawase, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 763 days.

(21) Appl. No.: 17/318,544

(22) Filed: May 12, 2021

(65) Prior Publication Data

US 2021/0373039 A1 Dec. 2, 2021

(30) Foreign Application Priority Data

May 28, 2020 (JP) .................................. 2020-093341

(51) Int. Cl.
*G01N 35/00* (2006.01)
*G01N 30/02* (2006.01)
(Continued)

(52) U.S. Cl.
CPC ....... *G01N 35/0092* (2013.01); *G06F 9/5027* (2013.01); *G01N 30/02* (2013.01);
(Continued)

(58) Field of Classification Search
CPC ......... G01N 35/0092; G01N 35/00871; G01N 30/02; G01N 2030/025; G01N 2030/027; G06F 9/5027
See application file for complete search history.

(56) References Cited

U.S. PATENT DOCUMENTS

| | | | |
|---|---|---|---|
| 2011/0016133 A1 | 1/2011 | Kim | |
| 2021/0231694 A1 | 7/2021 | Masuda | |
| 2022/0374816 A1* | 11/2022 | Pfleger | ............. G06Q 10/06316 |

FOREIGN PATENT DOCUMENTS

| | | |
|---|---|---|
| JP | 2008-051565 A | 3/2008 |
| JP | 2008-241386 A | 10/2008 |
| WO | 2020/031276 A1 | 2/2020 |

OTHER PUBLICATIONS

Office Action in corresponding Chinese Patent Application No. 202110564519.2 dated Nov. 17, 2023, with English machine translation.

* cited by examiner

*Primary Examiner* — Paul M. West
(74) *Attorney, Agent, or Firm* — Renner, Otto, Boisselle & Sklar, LLP

(57) ABSTRACT

Device information representing a configuration of each analysis device is acquired by a device information acquirer. Schedule information representing a use schedule of each analysis device is acquired by a schedule information acquirer. A sample analysis method is acquired by an analysis method acquirer. An analysis device that is fitted to the analysis method acquired by the analysis method acquirer and is usable is selected by a device selector from among a plurality of analysis devices based on the device information acquired by the device information acquirer and the schedule information acquired by the schedule information acquirer. Identification information for identifying the analysis device selected by the device selector is presented by a presenter.

13 Claims, 5 Drawing Sheets

(51) Int. Cl.
*G06F 9/50* (2006.01)
*G06Q 10/0631* (2023.01)
*H01J 49/26* (2006.01)

(52) U.S. Cl.
CPC . *G01N 2030/025* (2013.01); *G01N 2030/027* (2013.01); *G06Q 10/06312* (2013.01); *H01J 49/26* (2013.01)

ANALYSIS-DEVICE SELECTION DEVICE AND ANALYSIS-DEVICE SELECTION METHOD

BACKGROUND

Technical Field

The present invention relates to an analysis-device selection device and an analysis-device selection method.

Description of Related Art

A plurality of analysis devices such as a gas chromatograph, a liquid chromatograph or a mass spectrometer may be provided in a research facility at which an analysis of a sample is performed. Further, in such an analysis system, a management device such as a database management system, a laboratory data management system or a laboratory information management system is provided (see JP 2008-241386 A.) The plurality of analysis devices are managed by the management device. A user of the analysis system who is a member of the research facility can perform an analysis of a sample by selectively using an analysis device that is fitted to a desired analysis method from among the plurality of analysis devices.

SUMMARY

Since an analysis device includes a plurality of constituent elements such as various analysis columns or various detectors, types of analysis devices vary widely depending on a combination of these constituent elements. Therefore, it is not easy for an unskilled user to select an appropriate analysis device. Further, any of the analysis devices may be currently used by another user. Alternatively, any of the analysis devices may be scheduled to be used by another user. Therefore, each user is required to select an analysis device not to interfere with another user. However, since it may take a long period of time to perform an analysis depending on an analysis method, it is difficult to select an analysis device not to interfere with another user.

An object of the present invention is to provide an analysis-device selection device and an analysis-device selection method that enable easy selection of an appropriate analysis device.

One aspect of the present invention relates to an analysis-device selection device that is provided together with a plurality of analysis devices that analyze a sample and include a device information acquirer that acquires device information representing a configuration of each analysis device, a schedule information acquirer that acquires schedule information representing a use schedule of each analysis device, an analysis method acquirer that acquires a sample analysis method, a device selector that selects an analysis device that is fitted to an analysis method acquired by the analysis method acquirer and is usable based on device information acquired by the device information acquirer and schedule information acquired by the schedule information acquirer, and a presenter that presents identification information for identifying an analysis device selected by the device selector.

Another aspect of the present invention relates to an analysis-device selection method that is used by a plurality of analysis devices that analyze a sample and in clude acquiring device information representing a configuration of each analysis device, acquiring schedule information representing a use schedule of each analysis device, acquiring a sample analysis method, selecting an analysis device that is fitted to an acquired analysis method and is usable from among the plurality of analysis devices based on acquired device information and acquired schedule information, and presenting identification information for identifying a selected analysis device.

The present invention enable easy selection of an appropriate analysis device.

Other features, elements, characteristics, and advantages of the present disclosure will become more apparent from the following description of preferred embodiments of the present disclosure with reference to the attached drawings.

DETAILED DESCRIPTION (1) Configuration of Analysis System

Figure 1:
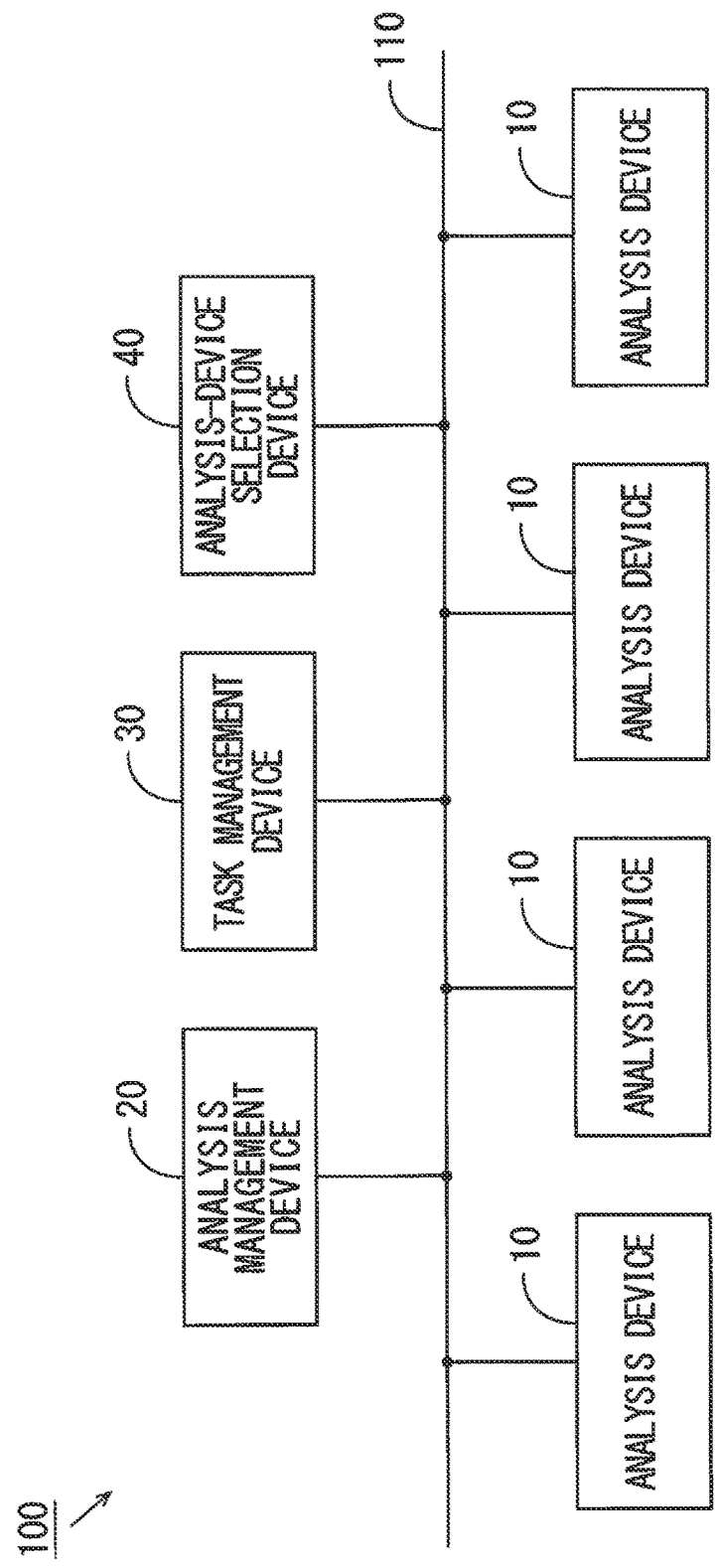
FIG. 1 is a diagram showing the configuration of an analysis system including an analysis-device selection device according to one embodiment of the present invention.

An analysis-device selection device and an analysis-device selection method according to embodiments of the present invention will be described below in detail with reference to the drawings. FIG. 1 is a diagram showing the configuration of an analysis system including the analysis-device selection device according to one embodiment of the present invention. As shown in FIG. 1, the analysis system 100 includes a plurality of analysis devices 10, an analysis management device 20, a task management device 30 and the analysis-device selection device 40. The analysis devices 10, the analysis management device 20, the task management device 30 and the analysis-device selection device 40 are respectively connected to a network 110 to be communicable with one another.

Each analysis device 10 includes one or a plurality of gas chromatographs, one or a plurality of liquid chromatographs or one or a plurality of mass spectrometers, for example. Each of the analysis management device 20, the task management device 30 and the analysis-device selection device 40 is realized by an information processing apparatus such as a personal computer and includes a CPU (Central Processing Unit) and a memory. The analysis management device 20, the task management device 30 and the analysis-device selection device 40 may be realized by a common information processing apparatus. In this case, the analysis management device 20, the task management device 30 and the analysis-device selection device 40 include a common CPU and a common memory.

The analysis management device 20 manages device information, schedule information and state information of each analysis device 10. Device information is the information for specifying the configuration of an analysis device 10 and represents a model of the analysis device 10, a type of a constituent element such as a separation column included in the analysis device 10, a type or an amount of a consumable such as a mobile phase. Schedule information represents whether an analysis device 10 is currently used, whether an analysis device 10 is scheduled to be used, etc. State information represents a temperature of a column oven, a pressure of a liquid sending pump, the number of times a consumable is used or a remaining amount of the consumable or the like, included in an analysis device 10.

The task management device 30 manages a plurality of method files that mention an analysis method with which any of the analysis devices 10 is used. An analysis method includes a model of the analysis device 10 to be used, a type of a constituent element to be used, or a type or an amount of a consumable. Further, a method file includes a period of time required for an analysis or a change in state of a constituent element (a temperature of the column oven or a pressure of the liquid sending pump, for example) in the analysis device 10 to be used.

The analysis-device selection device 40 selects an analysis device 10 that is fitted to an analysis method designated by a user based on device information, schedule information and state information of each analysis device 10. Further, the analysis-device selection device 40 presents identification information for identifying a selected analysis device 10 to the user. Details of the analysis-device selection device 40 will be described below.

(2) Analysis-Device Selection Device

Figure 2:
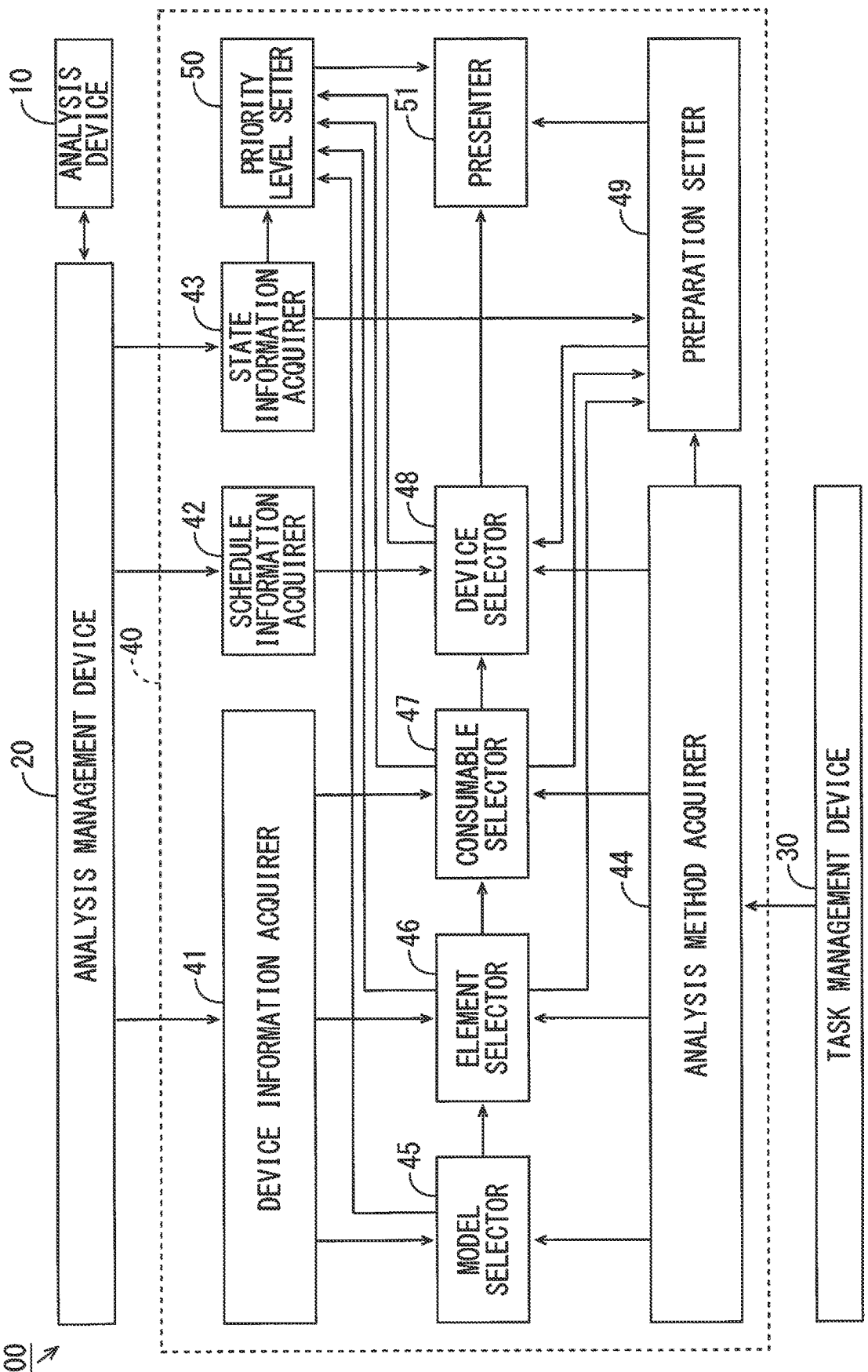
FIG. 2 is a diagram showing the configuration of the analysis-device selection device.

FIG. 2 is a diagram showing the configuration of the analysis-device selection device 40 of FIG. 1. As shown in FIG. 2, the analysis-device selection device 40 includes a device information acquirer 41, a schedule information acquirer 42, a state information acquirer 43, an analysis method acquirer 44, a model selector 45, an element selector 46, a consumable selector 47, a device selector 48, a preparation setter 49, a priority level setter 50 and a presenter 51. A CPU of the analysis-device selection device 40 executes a control program stored in a memory, whereby the functions of the analysis-device selection device 40 are implemented. Part or all of the functions of the analysis-device selection device 40 may be implemented by hardware such as an electronic circuit.

The device information acquirer 41 acquires device information of each analysis device 10 from the analysis management device 20. The schedule information acquirer 42 acquires schedule information of each analysis device 10 from the analysis management device 20. The state information acquirer 43 acquires state information of each analysis device 10 from the analysis management device 20. The analysis method acquirer 44 acquires a method file (an analysis method) designated by the user from the task management device 30. The user can designate a desired method file for the task management device 30. The analysis method acquirer 44 may acquire an analysis method that is directly input by the user.

The model selector 45 selects an analysis device 10 a model of which is used in a case where an analysis method acquired by the analysis method acquirer is executed and an analysis device 10 a model of which is compatible with the model from among the plurality of analysis devices 10 in the analysis system 100 based on device information acquired by the device information acquirer 41. The element selector 46 selects an analysis device 10 with which an analysis method is executable and an analysis device 10 to which a constituent element is attachable from among the analysis devices 10 selected by the model selector 45 based on device information. The analysis device 10 with which an analysis method is executable refers to an analysis device 10 to which a type of a constituent element that is to be used in a case where the analysis method is executed is attached.

The consumable selector 47 selects an analysis device 10 to which a consumable with which an analysis method is executable is attached and an analysis device to which the consumable is attachable from among the analysis devices 10 selected by the element selector 46 based on device information. An analysis device 10 to which a consumable with which an analysis method is executable is attached refers to an analysis device 10 to which a type of a consumable that is to be used in a case where the analysis method is executed is attached and in which a remaining amount of the consumable (the remaining number of times the consumable can be used or a remaining period of time during which the consumable can be used) is larger than an amount of the consumable to be used for an analysis.

The device selector 48 selects a currently usable analysis device 10. Specifically, from among the analysis devices 10 selected by the consumable selector 47, an analysis device 10 that is not being used or is not scheduled to be used, and an analysis device 10 that can end an analysis by a point in time at which the analysis device 10 is scheduled to be used are selected. Whether an analysis device 10 can end an analysis by a point in time at which the analysis device 10 is scheduled to be used is determined based on a period of time required for an analysis in a case where an analysis method is used.

The preparation setter 49 sets a preparing operation and a preparation period of time that are required to make each analysis device 10 selected by the device selector 48 be usable. For example, a period of time required to adjust a state (a pressure and a temperature, for example) of a constituent element at a current point in time represented by state information of each analysis device 10 acquired by the state information acquirer 43 to a state of the constituent element at a point in time at which an analysis with use of an analysis method is started is set as a preparation period of time.

Further, in a case where a required constituent element is not attached to an analysis device 10 selected by the element selector 46, attachment of the constituent element to the analysis device 10 is set as a preparing operation, and a period of time required for the preparing operation is set as a preparation period of time. In a case where a required consumable is not attached to an analysis device 10 selected by the consumable selector 47, attachment or replenishment of the consumable with respect to the analysis device 10 is set as a preparing operation, and a period of time required for the preparing operation is set as a preparation period of time. These preparation periods of time may be defined in advance in accordance with the type of a constituent element or the type of a consumable, or may be defined in advance to be constant.

The preparation period of time set by the preparation setter 49 is added to the period of time required for an analysis with use of an analysis method. Further, in a case where a constituent element or the like of an analysis device 10 is replaced, the original constituent element may be reattached to the analysis device 10 after an analysis ends. In this case, a period of time required for reattachment of a constituent element or the like may be set as a preparation period of time, and the set preparation period of time may further be added to a period of time required for an analysis.

The priority level setter 50 sets the priority level of use of an analysis device 10 selected by the device selector 48. For example, the priority level of an analysis device 10 a model of which is used in a case where an analysis method is executed is set higher than the priority level of an analysis device 10 that is compatible with the model. The priority level of an analysis device 10 having a constituent element the state of which requires a low degree of adjustment is set higher than the priority level of an analysis device 10 having a constituent element the state of which requires a high degree of adjustment.

Further, the priority level of an analysis device 10 that does not require an operation of attaching a constituent element is set higher than the priority level of an analysis device 10 that requires an operation of attaching a constituent element. The priority level of an analysis device 10 that does not require an operation of attaching or replenishing a consumable is set higher than the priority level of an analysis device 10 that requires an operation of attaching or replenishing a consumable.

The presenter 51 presents the identification information of an analysis device 10 selected by the device selector 48 to the user. Further, the presenter 51 presents a preparing operation and a preparation period of time of each analysis device 10 set by the preparation setter 49 to the user to correspond to the analysis device 10. Further, the presenter 51 presents a priority level of each analysis device 10 set by the priority level setter 50 to correspond to the an analysis device 10. As one example of a presentation method, in a case where the analysis system 100 includes a display device, identification information of an analysis device 10 may be displayed in the display device.

(3) Presentation Process

Figure 3:
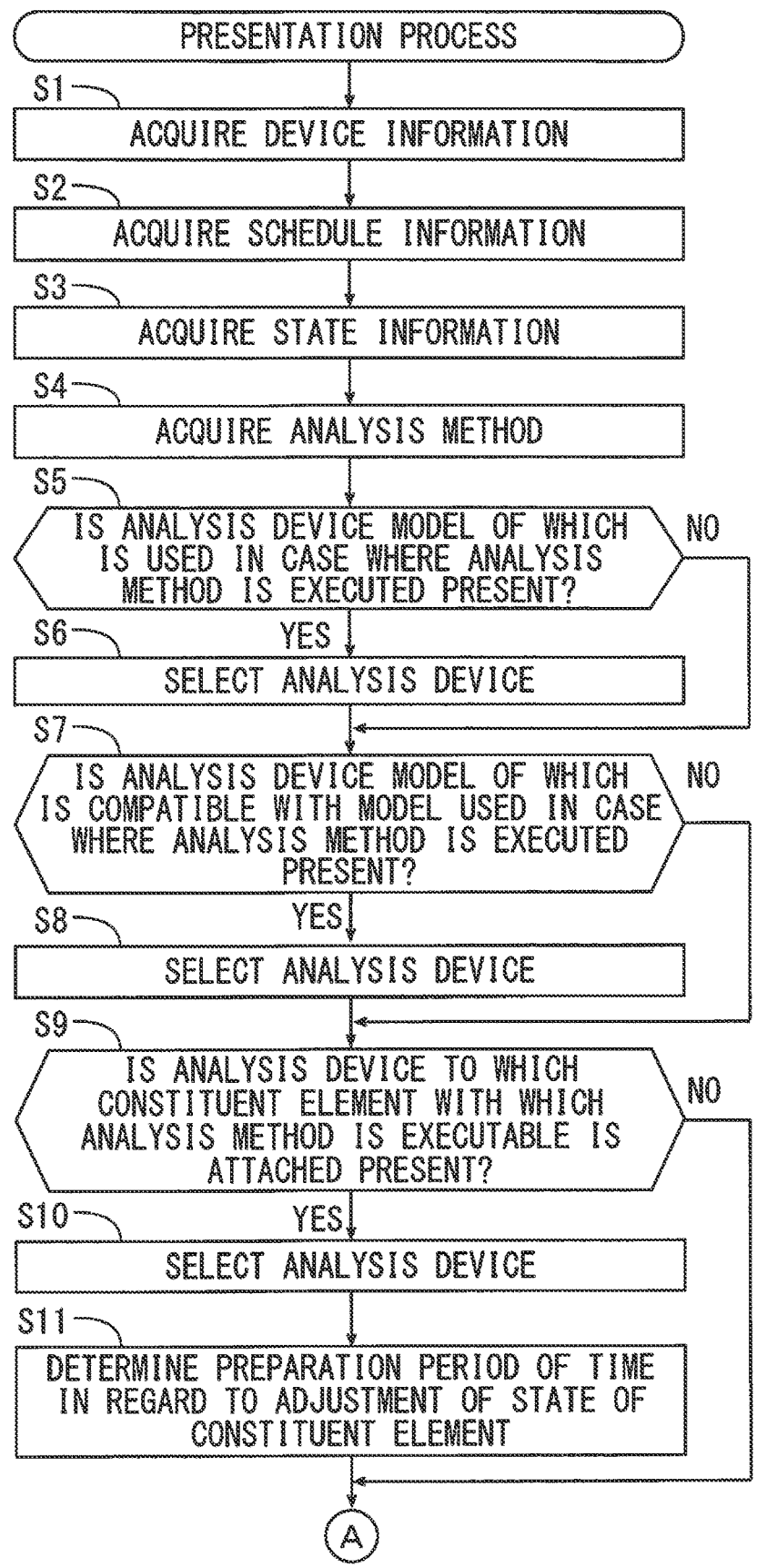
FIG. 3 is a flowchart showing one example of the algorithm of a presentation process executed by the analysis-device selection device.
Figure 4:
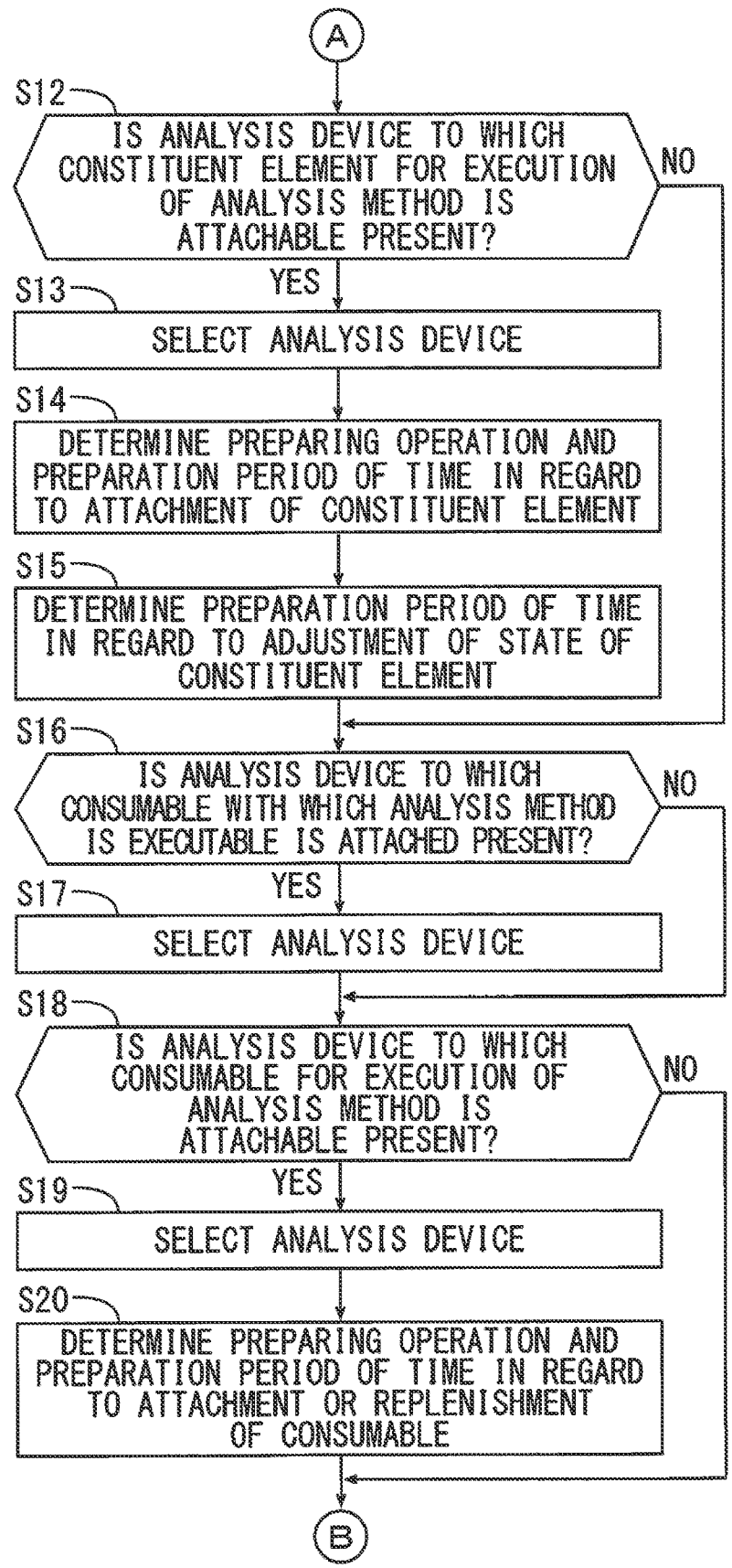
FIG. 4 is a flowchart showing the one example of the algorithm of the presentation process executed by the analysis-device selection device.
Figure 5:
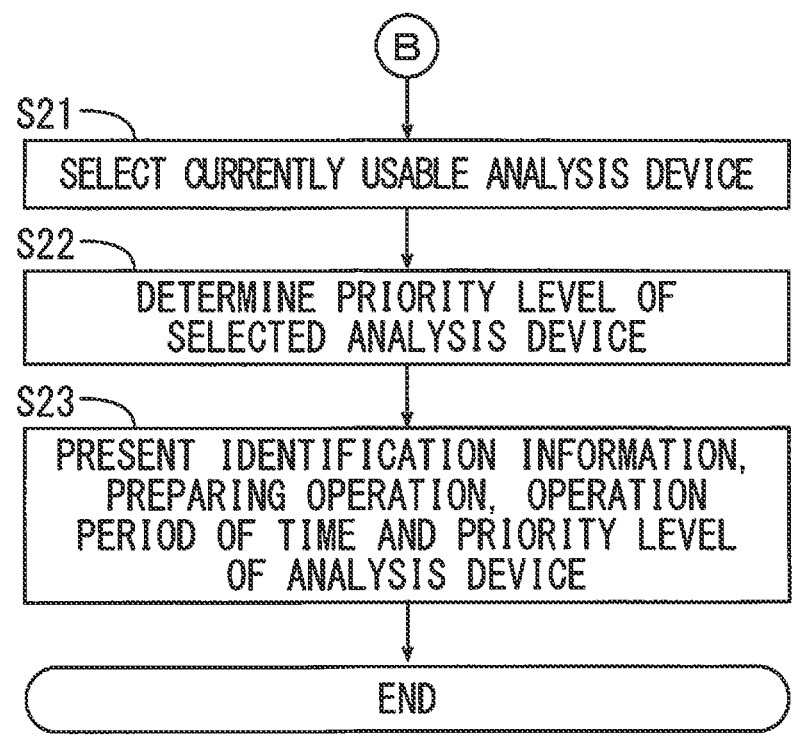
FIG. 5 is a flowchart showing the one example of the algorithm of the presentation process executed by the analysis-device selection device.

FIGS. 3, 4 and 5 are flowcharts showing one example of the algorithm of a presentation process executed by the analysis-device selection device 40. The device information acquirer 41 acquires device information from the analysis management device 20 (step S1). The schedule information acquirer 42 acquires schedule information from the analysis management device 20 (step S2). The state information acquirer 43 acquires state information from the analysis management device 20 (step S3).

The analysis method acquirer 44 acquires an analysis method from the task management device 30 (step S4). The analysis method acquirer 44 may acquire an analysis method by direct input of the analysis method by the user. Further, any one of the steps S1 to S4 may be executed first, and all of the steps S1 to S4 may be executed at the same time.

Next, the model selector 45 determines whether an analysis device 10 a model of which is used in a case where the analysis method acquired in the step S4 is executed is present among the plurality of analysis devices 10 in the analysis system 100 based on the device information acquired in the step S1 (step S5). In a case where the analysis device 10 is not present, the model selector 45 proceeds to the step S7. In a case where the analysis device 10 is present, the model selector 45 selects the analysis device 10 (step S6) and proceeds to the step S7.

In the step S7, the model selector 45 determines whether an analysis device 10 a model of which is compatible with the model that is used in a case where the analysis method acquired in the step S4 is executed is present among the plurality of analysis devices 10 in the analysis system 100 based on the device information acquired in the step S1 (step S7). In a case where the analysis device 10 is not present, the model selector 45 proceeds to the step S9. In a case where the analysis device 10 is present, the model selector 45 selects the analysis device 10 (step S8) and proceeds to the step S9.

In the step S9, the element selector 46 determines whether an analysis device 10 to which a constituent element with which the analysis method acquired in the step S4 is executable is present among the analysis devices 10 selected in the steps S6 and S8 based on the device information acquired in the step S1 (step S9). In a case where the analysis device 10 is not present, the element selector 46 proceeds to the step S12.

In a case where the analysis device 10 is present, the element selector 46 selects the analysis device 10 (step S10). Further, the preparation setter 49 sets a preparation period of time in regard to adjustment of state of a constituent element of the analysis device 10 selected in the step S10 based on the state information acquired in the step S3 and the analysis method acquired in the step S4 (step S11) and proceeds to the step S12.

In the step S12, the element selector 46 determines whether an analysis device to which a constituent element for execution of the analysis method acquired in the step S4 is attachable is present among the analysis devices 10 selected in the steps S6 and S8 based on the device information acquired in the step S1 (step S12). In a case where the analysis device 10 is not present, the element selector 46 proceeds to the step S16.

In a case where the analysis device 10 is present, the element selector 46 selects the analysis device 10 (step S13). Further, the preparation setter 49 sets a preparing operation and a preparation period of time in regard to attachment of a constituent element to the analysis device 10 selected in the step S13 (step S14). Further, the preparation setter 49 sets a preparation period of time in regard to adjustment of a state of a constituent element of the analysis device 10 selected in the step S13 (step S15) and proceeds to the step S16. The preparation period of time set in the step S15 may be defined in advance to be constant.

In the step S16, the consumable selector 47 determines whether an analysis device 10 to which a consumable with which the analysis method acquired in the step S4 is executable is attached is present among the analysis devices 10 selected in the steps S10 and S13 based on the device information acquired in the step S1 (step S16). In a case where the analysis device 10 is not present, the consumable selector 47 proceeds to the step S18. In a case where the analysis device 10 is present, the consumable selector 47 selects the analysis device 10 (step S17) and proceeds to the step S18.

In the step S18, the consumable selector 47 determines whether an analysis device 10 to which a consumable for execution of the analysis method acquired in the step S4 is attachable is present among the analysis devices 10 selected in the steps S10 and S13 based on the device information acquired in the step S1 (step S18). In a case where the analysis device 10 is not present, the consumable selector 47 proceeds to the step S21.

In a case where the analysis device 10 is present, the consumable selector 47 selects the analysis device 10 (step S19). Further, the preparation setter 49 sets a preparing operation and a preparation period of time in regard to attachment or replenishment of a consumable with respect to the analysis device 10 selected in the step S19 (step S20) and proceeds to the step S21.

In the step S21, the device selector 48 selects a currently usable analysis device 10 based on the schedule information acquired in the step S2, the analysis method acquired in the step S4 and the preparation period of time set in the steps S11, S14, S15 and S20 (step S21). Specifically, an analysis device 10 that is not being used or not scheduled to be used and an analysis device 10 that can end an analysis by a point in time at which the analysis device 10 is scheduled to be used are selected from among the analysis devices 10 selected in the steps S17 and S19.

Thereafter, the priority level setter 50 sets a priority level of the analysis device 10 selected in the step S21 (step S22). Here, the priority level of the analysis device 10 selected in the step S6 is higher than the priority level of the analysis device 10 selected in the step S8. The priority level of the analysis device 10 selected in the step S10 is higher than the priority level of the analysis device 10 selected in the step S13. The priority level of the analysis device 10 selected in the step S17 is higher than the priority level of the analysis device 10 selected in the step S19. In the step S11, the priority level of the analysis device 10 having a short preparation period of time set is higher than the priority level of the analysis device 10 having a long preparation period of time.

Finally, the presenter 51 presents the identification information of the analysis device 10 selected in the step S21, the preparing operation and the preparation period of time set in the steps S11, S14, S15 and S20 and the priority level of each analysis device 10 set in the step S22 (step S23). Thus, the presentation process ends.

(4) Effects

In the analysis-device selection device 40 according to the present embodiment, device information representing the configuration of each analysis device 10 is acquired by the device information acquirer 41. Schedule information representing the use schedule of each analysis device 10 is acquired by the schedule information acquirer 42. A sample analysis method is acquired by the analysis method acquirer 44. An analysis device that is fitted to the analysis method acquired by the analysis method acquirer 44 and is usable is selected from among a plurality of analysis devices 10 by the device selector 48 based on the device information acquired by the device information acquirer 41 and the schedule information acquired by the schedule information acquirer 42. Identification information for identifying the analysis device 10 selected by the device selector 48 is presented by the presenter 51.

With this configuration, the user can identify a usable analysis device 10 by viewing identification information presented by the analysis-device selection device 40 in regard to a desired analysis method. Thus, the user can select an appropriate analysis device 10 easily.

The analysis device 10 selected by the device selector 48 includes not only an analysis device 10 a model of which is used in a case where an analysis method is executed but also an analysis device 10 a model of which is compatible with the model that is used in a case where the analysis method is executed. Further, the analysis device 10 selected by the device selector 48 includes not only an analysis device 10 to which a constituent element with which an analysis method is executable is attached but also an analysis device 10 to which the constituent element is attachable. Further, the analysis device 10 selected by the device selector 48 includes not only an analysis device 10 to which a consumable with which an analysis method is executable is attached but also an analysis device 10 to which the consumable is attachable. Therefore, the user can select a more appropriate analysis device 10 easily.

Further, the priority level of use of each analysis device 10 selected by the device selector 48 is set by the priority level setter 50 based on the device information acquired by the device information acquirer 41 and the analysis method acquired by the analysis method acquirer 44. The priority level set by the priority level setter 50 is presented by the presenter 51. In this case, the user can select a more appropriate analysis device 10 easily by viewing the presented priority level.

Here, the priority level of an analysis device 10 a model of which is used in a case where an analysis method is executed is set higher than the priority level of an analysis device 10 a model of which is compatible with the model that is used in a case where the analysis method is executed. In this case, the priority level of an analysis device 10 that is more suitable for an analysis can be set high easily. The priority level of an analysis device 10 to which a constituent element with which an analysis method is executable is attached is set higher than the priority level of an analysis device 10 to which the constituent element is attachable. In this case, the priority level of an analysis device 10 that is usable without an operation of attaching a constituent element can be set high easily.

The priority level of an analysis device 10 to which a consumable with which the analysis method acquired by the analysis method acquirer 44 is executable is set higher than the priority level of an analysis device 10 to which the consumable is attachable. In this case, the priority level of an analysis device 10 that is usable without an operation of attaching or replenishing a consumable can be set high easily. The closer the state of a constituent element of an analysis device 10 represented by the state information acquired by the state information acquirer 43 is to the state of a constituent element at a point in time at which an analysis is started with use of an analysis method, the higher the priority level of the analysis device 10 is set. In this case, the priority level of an analysis device 10 that requires a short period of time to adjust the state of a constituent element can be set high easily.

Further, a preparing operation and a preparation period of time that are required to make the analysis device 10 selected by the device selector 48 be usable are set by the preparation setter 49 based on the device information acquired by the device information acquirer 41 and the analysis method acquired by the analysis method acquirer 44. In the selection of an analysis device 10 by the device selector 48, a preparation period of time required to make the analysis device 10 be usable is considered. Therefore, the user can select an appropriate analysis device 10 easily even in a case where an operation of making the analysis device 10 be usable is required.

Further, the preparing operation and the preparation period of time set by the preparation setter 49 are presented by the presenter 51. In this case, the user can easily identify the preparing operation and the preparation period of time required to make the analysis device 10 be usable. Further, the user can select a more appropriate analysis device 10 by identifying the preparing operation and the preparation period of time.

(5) Other Embodiments (a) While the priority level of use of an analysis device 10 selected by the device selector 48 is set and the set priority level is presented by the presenter 51 in the above-mentioned embodiment, the embodiment is not limited to this. The priority level of use of an analysis device 10 selected by the device selector 48 does not have to be set or does not have to be presented by the presenter 51. In this case, the analysis-device selection device 40 does not include the priority level setter 50. Further, the step S22 in the presentation process is not executed.

(b) While both of a preparing operation and a preparation period of time are set and both of the set preparing operation and the set preparation period of time are presented by the presenter 51 in the above-mentioned embodiment, the embodiment is not limited to this. Only one of a preparing operation and a preparation period of time may be set and may be presented by the presenter 51. In this case, part of the steps S11, S14, S15 and S20 in the presentation process is not executed.

Alternatively, neither a preparing operation nor a preparation period of time may be set. In this case, the analysis-device selection device 40 does not include the preparation setter 49. Further, all of the steps S11, S14, S15 and S20 in the presentation process are not executed. In a case where a preparation period of time is not set, the preparation period of time is not added to a period of time required for an analysis with use of an analysis method.

(c) While a preparation period of time for adjustment of the state of a constituent element at a current point in time to the state of the constituent element at a point in time at which an analysis is started with use of an analysis method in the above-mentioned embodiment, the present embodiment is not limited to this. A preparation period of time required for adjustment of the state of the constituent element at a current point in time to the state of the constituent element at a point in time at which an analysis is started with use of an analysis method does not have to be set. In this case, the analysis-device selection device 40 does not include the state information acquirer 43. Further, the steps S3, S11 and S15 in the presentation process are not executed.

(d) While the model selector 45 selects an analysis device 10 a model of which is used in a case where an analysis method is executed and an analysis device 10 a model of which is compatible with the model that is used in a case where the analysis method is executed in the above-mentioned embodiment, the embodiment is not limited to this. The model selector 45 may select an analysis device 10 a mode of which is used in a case where an analysis method is executed and does not have to select an analysis device 10 a model of which is compatible with the model that is used in a case where the analysis method is executed. In this case, the steps S7 and S8 in the presentation process are not executed.

(e) While the element selector 46 selects an analysis device 10 to which a constituent element with which an analysis method is executable is attached and an analysis device 10 to which the constituent element is attachable in the above-mentioned embodiment, the embodiment is not limited to this. The element selector 46 may select an analysis device 10 to which a constituent element with which an analysis method is executable is attached and does not have to select an analysis device 10 to which the constituent element is attachable. In this case, the steps S12 to S15 in the presentation process are not executed.

(f) While the consumable selector 47 selects an analysis device 10 to which a consumable with which an analysis method is executable is attached and an analysis device 10 to which the consumable is attachable in the above-mentioned embodiment, the embodiment is not limited to this. The consumable selector 47 may select an analysis device 10 to which a consumable with which an analysis method is executable is attached and does not have to select an analysis device 10 to which the consumable is attachable. In this case, the steps S18 to S20 in the presentation process are not executed.

(6) Aspects

It is understood by those skilled in the art that the plurality of above-mentioned illustrative embodiments are specific examples of the below-mentioned aspects.

(Item 1) An analysis-device selection device according to one aspect that is provided together with a plurality of analysis devices that analyze a sample may include a device information acquirer that acquires device information representing a configuration of each analysis device, a schedule information acquirer that acquires schedule information representing a use schedule of each analysis device, an analysis method acquirer that acquires a sample analysis method, a device selector that selects an analysis device that is fitted to an analysis method acquired by the analysis method acquirer and is usable based on device information acquired by the device information acquirer and schedule information acquired by the schedule information acquirer, and a presenter that presents identification information for identifying an analysis device selected by the device selector.

With this configuration, the user can identify a usable analysis device by viewing identification information presented by the analysis-device selection device in regard to a desired analysis method. Thus, the user can select an appropriate analysis device easily.

(Item 2) The analysis-device selection device according to item 1 may further include a priority level setter that sets a priority level of use of each analysis device selected by the device selector based on device information acquired by the device information acquirer and an analysis method acquired by the analysis method acquirer, wherein the presenter may further present a priority level set by the priority level setter.

In this case, the user can select a more appropriate analysis device easily by viewing the presented priority level.

(Item 3) The analysis-device selection device according to item 2 may further include a model selector that selects an analysis device a model of which is used in a case where an analysis method acquired by the analysis method acquirer is executed and an analysis device a model of which is compatible with the model that is used in a case where the analysis method is executed from among the plurality of devices based on device information acquired by the device information acquirer, wherein the device selector may select an analysis device that is fitted to an analysis method acquired by the analysis method acquirer and is usable from among analysis devices selected by the model selector.

In this case, not only an analysis device a model of which is used in a case where an analysis method is executed but also an analysis device a model of which is compatible with the model that is used in a case where the analysis method is executed are selected as analysis devices that are fitted to the analysis method and are usable. Therefore, a larger number of usable analysis devices are presented. Thus, the user can select a more appropriate analysis device easily.

(Item 4) In the analysis-device selection device according to item 3, the priority level setter may set a priority level of an analysis device a model of which is used in a case where an analysis method acquired by the analysis method acquirer is executed higher than a priority level of an analysis device a model of which is compatible with the model that is used in a case where the analysis method is executed, among analysis devices selected by the model selector.

In this case, the priority level of an analysis device more fitted to an analysis can be set high easily.

(Item 5) The analysis-device selection device according to item 3 or 4 may further include an element selector that selects an analysis device to which a constituent element with which an analysis method acquired by the analysis method acquirer is executable is attached and an analysis device to which the constituent element is attachable from among analysis devices selected by the model selector based on device information acquired by the device information acquirer, wherein the device selector may select an analysis device that is fitted to an analysis method acquired by the analysis method acquirer and is usable from among analysis devices selected by the element selector.

In this case, not only an analysis device to which a constituent element with which an analysis method is executable is attached but also an analysis device to which the constituent element is attachable are selected as analysis devices that are fitted to the analysis method and are usable. Therefore, a larger number of usable analysis devices are presented. Thus, the user can select a more appropriate analysis device easily.

(Item 6) In the analysis-device selection device according to item 5, the priority level setter may set a priority level of an analysis device to which a constituent element with which an analysis method acquired by the analysis method acquirer is executable is attached higher than a priority level of an analysis device to which the constituent element is attachable, among analysis devices selected by the element selector.

In this case, the priority level of an analysis device that is usable without execution of an operation of attaching a constituent element can be set high easily.

(Item 7) The analysis-device selection device according to item 5 or 6 may further include a consumable selector that selects an analysis device to which a consumable with which an analysis method acquired by the analysis method acquirer is executable is attached and an analysis device to which the consumable is attachable from among analysis devices selected by the element selector based on device information acquired by the device information acquirer, wherein the device selector may select an analysis device that is fitted to an analysis method acquired by the analysis method acquirer and is usable from among analysis devices selected by the consumable selector.

In this case, not only an analysis device to which a consumable with which an analysis method is executable is attached but also an analysis device to which the consumable is attachable are selected as analysis devices that are fitted to the analysis method and are usable. Therefore, a larger number of usable analysis devices are presented. Thus, the user can select a more appropriate analysis device easily.

(Item 8) In the analysis-device selection device according to item 7, the priority level setter may set a priority level of an analysis device to which a consumable with which an analysis method acquired by the analysis method acquirer is executable is attached higher than a priority level of an analysis device to which the consumable is attachable, among analysis devices selected by the consumable selector.

In this case, the priority level of an analysis device that is usable without an operation of attaching or replenishing a consumable can be set high easily.

(Item 9) The analysis-device selection device according to any one of claims 2 to 8 may further include a state information acquirer that acquires state information representing a state of a constituent element of each analysis device, wherein the priority level setter may set priority levels such that the closer a state of a constituent element of an analysis device represented by state information acquired by the state information acquirer is to a state of the constituent element at a point in time at which an analysis with use of an analysis method acquired by the analysis method acquirer is started, the higher a priority level is.

In this case, the priority level of an analysis device that requires a short period of time to adjust the state of a constituent element can be set high easily.

(Item 10) The analysis-device selection device according to any one of items 1 to 9 may further include a preparation setter that sets a preparation period of time required to make an analysis device selected by the device selector be usable based on device information acquired by the device information acquirer and an analysis method acquired by the analysis method acquirer, wherein the device selector may select a usable analysis device based on a preparation period of time set by the preparation setter in addition to the device information and the analysis method.

In this case, a usable analysis device is presented in consideration of a preparation period of time required to make an analysis device be usable. Therefore, the user can select an appropriate analysis device easily even in a case where an operation for making an analysis device usable is required.

(Item 11) In the analysis-device selection device according to item 10, the presenter may further present a preparation period of time set by the preparation setter.

In this case, the user can easily identify a preparation period of time required to make an analysis device be usable. Further, the user can select a more appropriate analysis device by identifying a preparation period of time.

(Item 12) In the analysis-device selection device according to item 10 or 11, the preparation setter may further set a preparing operation required to make an analysis device selected by the device selector be usable based on device information acquired by the device information acquirer and an analysis method acquired by the analysis method acquirer, and the presenter may further present a preparing operation set by the preparation setter.

In this case, the user can easily identify a preparing operation required to make an analysis device be usable. Further, the user can select a more appropriate analysis device by identifying the preparing operation.

(Item 13) An analysis-device selection method according to another aspect that is used by a plurality of analysis devices that analyze a sample may include acquiring device information representing a configuration of each analysis device, acquiring schedule information representing a use schedule of each analysis device, acquiring a sample analysis method, selecting an analysis device that is fitted to an acquired analysis method and is usable from among the plurality of analysis devices based on acquired device information and acquired schedule information, and presenting identification information for identifying a selected analysis device.

With this analysis-device selection method, the user can identify a usable analysis device by viewing the identification information presented in regard to a desired analysis method. Thus, an appropriate analysis device can be selected easily.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. An analysis-device selection device that is provided together with a plurality of analysis devices that analyze a sample, comprising:
a device information acquirer that acquires device information representing a constituent element attached to each analysis device and a consumable used in each analysis device;
a schedule information acquirer that acquires schedule information representing a use schedule of each analysis device;
an analysis method acquirer that acquires a sample analysis method, and a constituent element used to execute the sample analysis method and a consumable used for the sample analysis method;
a device selector that selects an analysis device that is fitted to the constituent element and the consumable acquired by the analysis method acquirer and is usable from among the plurality of analysis devices based on the device information acquired by the device information acquirer and the schedule information acquired by the schedule information acquirer; and
a presenter that presents identification information for identifying an analysis device selected by the device selector.

2. The analysis-device selection device according to claim 1, further comprising a priority level setter that sets a priority level of use of each analysis device selected by the device selector based on device information acquired by the device information acquirer and an analysis method acquired by the analysis method acquirer, wherein
the presenter further presents a priority level set by the priority level setter.

3. The analysis-device selection device according to claim 2, further comprising a model selector that selects an analysis device a model of which is used in a case where an analysis method acquired by the analysis method acquirer is executed and an analysis device a model of which is compatible with the model that is used in a case where the analysis method is executed from among the plurality of devices based on device information acquired by the device information acquirer, wherein
the device selector selects an analysis device that is fitted to an analysis method acquired by the analysis method acquirer and is usable from among analysis devices selected by the model selector.

4. The analysis-device selection device according to claim 3, wherein
the priority level setter sets a priority level of an analysis device a model of which is used in a case where an analysis method acquired by the analysis method acquirer is executed higher than a priority level of an analysis device a model of which is compatible with the model that is used in a case where the analysis method is executed, among analysis devices selected by the model selector.

5. The analysis-device selection device according to claim 3, further comprising:
an element selector that selects an analysis device to which a constituent element with which an analysis method acquired by the analysis method acquirer is executable is attached and an analysis device to which the constituent element is attachable from among analysis devices selected by the model selector based on device information acquired by the device information acquirer, wherein
the device selector selects an analysis device that is fitted to an analysis method acquired by the analysis method acquirer and is usable from among analysis devices selected by the element selector.

6. The analysis-device selection device according to claim 5, wherein
the priority level setter sets a priority level of an analysis device to which a constituent element with which an analysis method acquired by the analysis method acquirer is executable is attached higher than a priority level of an analysis device to which the constituent element is attachable, among analysis devices selected by the element selector.

7. The analysis-device selection device according to claim 5, further comprising a consumable selector that selects an analysis device to which a consumable with which an analysis method acquired by the analysis method acquirer is executable is attached and an analysis device to which the consumable is attachable from among analysis devices selected by the element selector based on device information acquired by the device information acquirer, wherein
the device selector selects an analysis device that is fitted to an analysis method acquired by the analysis method acquirer and is usable from among analysis devices selected by the consumable selector.

8. The analysis-device selection device according to claim 7, wherein
the priority level setter sets a priority level of an analysis device to which a consumable with which an analysis method acquired by the analysis method acquirer is executable is attached higher than a priority level of an analysis device to which the consumable is attachable, among analysis devices selected by the consumable selector.

9. The analysis-device selection device according to claim 2, further comprising a state information acquirer that acquires state information representing a state of a constituent element of each analysis device, wherein
the priority level setter sets priority levels such that the closer a state of a constituent element of an analysis device represented by state information acquired by the state information acquirer is to a state of the constituent element at a point in time at which an analysis with use of an analysis method acquired by the analysis method acquirer is started, the higher a priority level is.

10. The analysis-device selection device according to claim 1, further comprising a preparation setter that sets a preparation period of time required to make an analysis device selected by the device selector be usable based on device information acquired by the device information acquirer and an analysis method acquired by the analysis method acquirer, wherein
the device selector selects a usable analysis device based on a preparation period of time set by the preparation setter in addition to the device information and the analysis method.

11. The analysis-device selection device according to claim 10, wherein
the presenter further presents a preparation period of time set by the preparation setter.

12. The analysis-device selection device according to claim 10 wherein
the preparation setter further sets a preparing operation required to make an analysis device selected by the device selector be usable based on device information acquired by the device information acquirer and an analysis method acquired by the analysis method acquirer, and the presenter further presents a preparing operation set by the preparation setter.

13. An analysis-device selection method that is used for a plurality of analysis devices that analyze a sample, including:

acquiring device information representing a constituent element attached to each analysis device and a consumable used in each analysis device;

acquiring schedule information representing a use schedule of each analysis device;

acquiring a sample analysis method, and a constituent element used to execute the sample analysis method and a consumable used for the sample analysis method;

selecting an analysis device that is fitted to the acquired constituent element and the acquired consumable and is usable from among the plurality of analysis devices based on the acquired device information and the acquired schedule information; and presenting identification information for identifying a selected analysis device.

\* \* \* \* \*